June 5, 1962   H. B. PENNEY ET AL   3,037,464
CABLE GRIP
Filed April 12, 1960
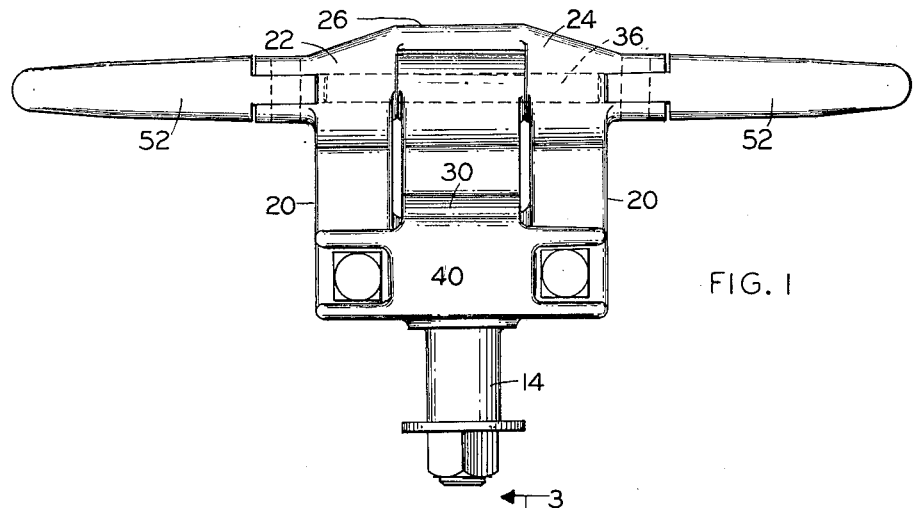
FIG. 1
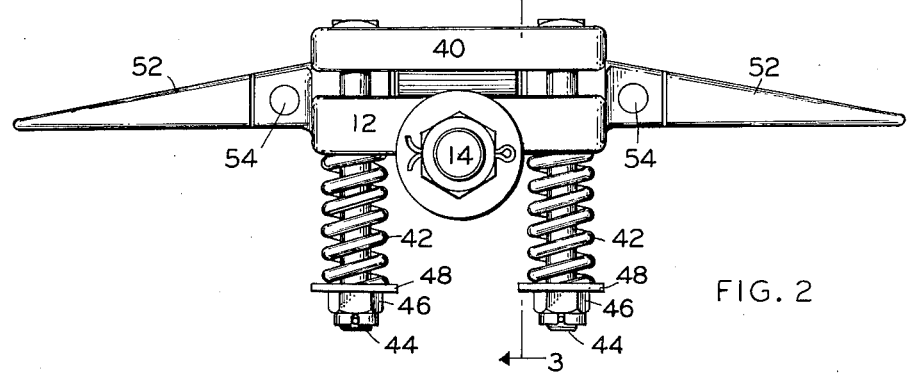
FIG. 2
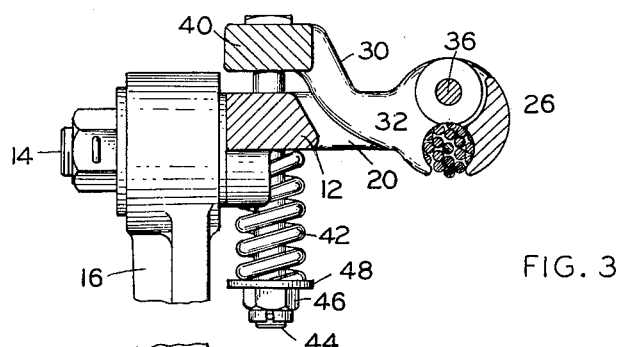
FIG. 3
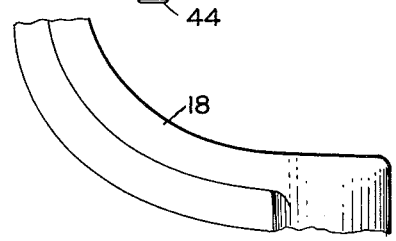
INVENTORS
HARLAN B. PENNEY
PHILIP A. ROBERTSON
BY *Kenway, Jenney, Witter
& Hildreth*
ATTORNEYS

United States Patent Office 3,037,464
Patented June 5, 1962

3,037,464
CABLE GRIP
Harlan B. Penney, Mechanic Falls, Maine, and Philip A. Robertson, North Conway, N.H., assignors to J. W. Penney & Sons Co., Mechanic Falls, Maine, a corporation of Maine
Filed Apr. 12, 1960, Ser. No. 21,635
5 Claims. (Cl. 104—209)

The present invention relates to cable grips for aerial rope tramways such as ski tows and chair lifts.

In aerial rope tramways of the endless cable type, it is essential that the attachment of the hangers to the cable be such as will permit the cable freely to run over the numerous supporting sheaves at the towers and around the main sheaves or bull wheels at the top and bottom stations, and also to run under the hold-down sheaves that may be required at towers where a change in cable direction would tend to lift the cable away from its supporting sheave. While cable grips have heretofore been utilized in which the cable is completely encircled by the gripping means, in the interest of a smooth ride and freedom from shock or jar it is preferable to have the cable gripping means only partially surround the cable so that the underside of the cable is directly exposed to and rides on the supporting sheaves as the cable grip is carried past.

Another aspect of importance is to minimize stress concentrations in the cable so as to prevent fatigue, and to avoid any permanent or semi-permanent clamping devices, while still providing ample clamping force to prevent slippage. It has been established that, in the interest of safety and long cable life, it is highly desirable to change the location of the cable grips along the cable at frequent intervals, not only to eliminate the possibility of corosion beneath the clamp, but also to distribute the effects of the clamping action and thereby to utilize the cable properties as uniformly as possible.

It is therefore an object of the invention to provide a cable grip or clamp for aerial rope tramways, characterized by powerful but resilient clamping means that provides maximum safety, yet which permits the clamping pressure readily to be relieved sufficiently for repositioning the clamp along the cable without the necessity for removing the clamp from the cable or for loosening or changing the clamping adjustment.

The several features of the cable clamp of the invention will become apparent from the description which follows, taken in conjunction with the accompanying drawings, in which FIG. 1 is a top plan view of the clamp, FIG. 2 is a side elevation, and FIG. 3 is an end view, partly in section and with portions of the hanger illustrated.

The cable clamp comprises a main body of generally rectangular configuration, having a portion 12 disposed in parallel spaced relation to the cable at one side thereof and having a heavy stub shaft 14 perpendicular to the cable axis for pivotal attachment of the hanger 16. The hanger has the usual offset portion 18 to permit the load, such as a chair or a T-bar unit of a tramway, to be applied in a direction intersecting the cable axis.

The main body includes spaced members 20 integral with the shaft-carrying portion 12 and extending therefrom toward the cable axis, these spaced members having portions 22, 24 overlying the cable. These spaced overlying portions are joined by the integral jaw member 26 disposed at the far side of the cable from the main body portion. The inner portion of the jaw is curved to conform to the cable, the jaw tapering in section and terminating adjacent the bottom of the cable so as to leave the central lowermost portion of the cable exposed.

The main body portion thus comprises a generally rectangular body, as viewed in plan, with a central rectangular opening within which is received the movable jaw member 30 having a depending cable engaging jaw 32 embracing the near side of the cable opposite the fixed jaw 26 on the outside. The movable jaw member is pivotally connected to the main body member 12 by means of a short shaft 36 extending through the movable jaw 32 in the region above and parallel to the cable axis, the ends of the shaft 36 being received and anchored against endwise displacement within bores in the cable-overlying regions 22, 24. Thus, as viewed in FIG. 3, movement of the movable jaw member 30 in a counterclockwise direction about the shaft 36 as an axis serves to clamp the grip to the cable, while upward or clockwise rotation of the member 30 results in loosening the grip on the cable.

As viewed in FIG. 3, the portion 30 of the movable jaw member extends upwardly through the central opening in the rectangular main frame and is provided with an integral bar-like outer end portion 40 corresponding in outline to and overlying the frame portion 12. The portions 12 and 40 are normally spaced somewhat, as shown in FIGS. 2 and 3, when a cable is in position between the jaws. To provide powerful, resilient clamping action of the jaws, a pair of clamp springs 42 is employed to urge the portions 12, 40 toward one another. Bolts 44 extend downwardly through the ends of these portions, the bolts preferably having squared heads received in recesses formed in the top surface of the portion 40 for non-rotating retention. The bolts extend through the body portion 12 and through the springs beneath. By tightening the nuts 46 until the distance between each washer 48 and the under surface of the body 12 is a predetermined amount, which may readily be determined by a suitable gage, the proper compressive force is applied to the clamp to insure safe gripping of the cable without risk of damage due to crushing or deformation of the cable. The nuts 46 may be self-locking, or secured by cotter pins after adjustment is completed. As a further safety feature, the spring force and the leverage provided by the clamping jaws may readily be made such that adequite gripping of the cable is provided by either spring singly, in case one of the springs should break. The exposed disposition of the springs is advantageous in minimizing clogging due to ice and in reducing corrosion, as well as making possible convenient and frequent inspection to reduce the likelihood of breakage.

It is evident that the clamp configuration permits the cable to run smoothly over sheaves, and around the large sheaves at the top and bottom stations. To permit the clamp also to ride beneath hold-down sheaves, where necessary because of changes in slope of the terrain, tapered extensions 52 are provided, pivotally connected to the cable-overlying portions 22, 24 by cooperating tongue and slot portions and transverse pins 54. These tapered extensions are preferably crowned in cross section to provide a rounded top surface leading smoothly into and away from the rounded overlying portions 22, 24 of the main body member and the correspondingly curved upper portion of the movable jaw 32 between the portions 22, 24, the upwardly extending arm portion 30 and the bolt-receiving bar portion 40 being disposed well beyond the flange region of any hold-down sheave under which the cable is required to pass.

The construction and configuration of the cable clamp of the present invention thus make possible extremely effective clamping and supporting properties, with the inner and outer jaw portions of substantially equal area and extent for symmetrical clamping pressure on the cable. The spaced portions of the main body member adjacent the outer, fixed jaw, provide in conjunction with the central movable jaw, a relatively long supporting surface to enable the clamp to distribute heavy loads with maximum stability. Furthermore, the open nature of the cooperating springs and spring-pressed members 12, 40 permits the jaws readily to be opened by a suitable power-actuated portable tool to enable the clamp quickly and easily and therefore at frequent intervals to be repositioned along the cable in accordance with desirable and generally required practice.

We claim as our invention:

1. A cable grip comprising a body of generally rectangular configuration, a portion of the body being disposed laterally of the cable in spaced relation thereto, a hanger-supporting shaft carried by said body portion and disposed substantially at a right angle to the cable axis, spaced arm portions extending from the aforesaid shaft-supporting body portion toward the cable and overlying the cable, an integral cable-engaging jaw portion joining said arm portions outwardly of the cable on the side of the cable away from the main body portion, a relatively movable jaw member intermediate the arm portions of the body, a pivotal connection between the movable jaw member and the main body portion, the pivotal connection having its axis parallel to and closely adjacent the cable, said jaw member having a depending cable engaging jaw in opposed relation to the first-mentioned jaw portion and inwardly of the cable, said jaws partially encircling the cable and terminating substantially flush with the underside of the cable, and means urging the movable jaw member about its pivotal axis to clamp the cable between the jaws.

2. A cable grip comprising a body of generally rectangular configuration, a portion of the body being disposed laterally of the cable in spaced relation thereto, a hanger-supporting shaft carried by said body portion and disposed substantially at a right angle to the cable axis, spaced arm portions extending from the aforesaid shaft-supporting body portion toward the cable and overlying the cable, an integral cable-engaging jaw portion joining said arm portions outwardly of the cable on the side of the cable away from the main body portion, a relatively movable jaw member intermediate the arm portions of the body, a pivotal connection between the movable jaw member and the main body portion, the pivotal connection having its axis parallel to and closely adjacent the cable, said jaw member having a depending cable engaging jaw in opposed relation to the first-mentioned jaw portion and inwardly of the cable, and means comprising a pair of compression springs exposed beneath the said body portion for urging the jaw members toward one another in resilient clamping relation.

3. A cable grip comprising a body of generally rectangular configuration, a portion of the body being disposed laterally of the cable in spaced relation thereto, a hanger-supporting shaft carried by said body portion and disposed substantially at a right angle to the cable axis, spaced arm portions extending from the aforesaid shaft-supporting body portion toward the cable and overlying the cable, an integral cable-engaging jaw portion joining said arm portions outwardly of the cable on the side of the cable away from the main body portion, a relatively movable jaw member intermediate the arm portions of the body, a pivotal connection between the movable jaw member and the main body portion, the pivotal connection having its axis parallel to and closely adjacent the cable, said jaw member having a depending cable engaging jaw in opposed relation to the first-mentioned jaw portion and inwardly of the cable, the movable jaw member having a portion extending from the jaw portion transversely of the cable axis into overlying relation with the shaft-supporting portion of the main body, and means comprising a pair of tension members and a pair of compression springs thereon and exposed beneath the said body portion for urging the jaw members toward one another in resilient clamping relation.

4. A cable grip comprising a body of generally rectangular configuration, a portion of the body being disposed laterally of the cable in spaced relation thereto, a hanger-supporting shaft carried by said body portion and disposed substantially at a right angle to the cable axis, spaced arm portions extending from the aforesaid shaft-supporting body portion toward the cable and overlying the cable, an integral cable-engaging jaw portion joining said arm portions outwardly of the cable on the side of the cable away from the main body portion, a relatively movable jaw member intermediate the arm portions of the body, said jaw member having a depending cable engaging jaw in opposed relation to the first-mentioned jaw portion and inwardly of the cable, pivotal connections between the jaws, said connections being disposed on a axis parallel to and above the cable, the movable jaw member having a portion extending from the jaw portion transversely of the cable axis into overlying relation with the shaft-supporting portion of the main body, a pair of bolts extending through said movable jaw portion in the region overlying the shaft-supporting region of the main body, and through said portion of the main body, and a pair of compression springs on said bolts for urging the jaw members toward one another in resilient clamping relation.

5. A cable grip comprising a body of generally rectangular centrally-open configuration, a portion of the body being disposed laterally of the cable in spaced parallel relation thereto, a hanger-supporting shaft carried by said laterally-spaced portion of the body, said shaft being substantially perpendicular to the cable axis, the body having spaced arm portions extending from the aforesaid shaft-supporting portion toward and overlying the cable, an integral cable-engaging jaw portion joining said arm portions outwardly of the cable on the side of the cable remote from the main body portion, tapered extension members aligned with and overlying the cable and pivotally connected to the arm portions about pivotal axes transversely of and above the cable, a relatively movable jaw member intermediate the arm portions of the body, a pivotal connection between the movable jaw member and the main body comprising a shaft parallel to and above the cable closely adjacent thereto, said jaw member having a depending cable engaging jaw in opposed relation to the first-mentioned jaw portion and inwardly of the cable, said jaws partially encircling the cable and terminating substantially flush with the underside of the cable, the movable jaw member having an arm extending from the jaw portion toward and overlying the shaft-supporting portion of the main body, and jaw-actuating means comprising a pair of bolts through said jaw and body portions and compression springs on said bolts for urging the arm portion of the movable jaw toward the adjacent body portion to apply resilient clamping pressure to the jaws, the radial distance between the pivotal support of the movable jaw and the point of application of the spring pressure being substantially greater than the radial distance of the cable center from the pivotal center of the jaw.

References Cited in the file of this patent

UNITED STATES PATENTS

| 738,307 | Finlayson | Sept. 8, 1903 |

FOREIGN PATENTS

| 816,547 | Germany | Oct. 11, 1951 |
| 284,670 | Switzerland | Dec. 1, 1952 |